(12) United States Patent
Zelesky

(10) Patent No.: US 10,975,723 B2
(45) Date of Patent: Apr. 13, 2021

(54) GAS TURBINE ENGINE INCLUDING SEAL PLATE PROVIDING INCREASED COOLING ADJACENT CONTACT AREA

(71) Applicant: United Technologies Corporation, Farmington, CT (US)

(72) Inventor: Mark F. Zelesky, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 2 days.

(21) Appl. No.: 16/285,820

(22) Filed: Feb. 26, 2019

(65) Prior Publication Data
US 2020/0271013 A1   Aug. 27, 2020

(51) Int. Cl.
*F01D 25/18* (2006.01)
*F01D 25/12* (2006.01)
(Continued)

(52) U.S. Cl.
CPC .......... *F01D 25/125* (2013.01); *F01D 25/16* (2013.01); *F01D 25/183* (2013.01); *F16C 33/72* (2013.01);
(Continued)

(58) Field of Classification Search
CPC ........................ F16J 15/34; F16J 15/342; F16J 15/3404–3432; F16C 33/6659; F16C 33/6677; F16C 27/045; F01D 25/125; F01D 25/162; F01D 25/18; F01D 25/183; F01D 25/186; F01D 11/003
See application file for complete search history.

(56) References Cited

U.S. PATENT DOCUMENTS 2,857,182 A * 10/1958 Bain ........................ F16J 15/38
277/401
2,990,202 A * 6/1961 Dennison .............. F01D 25/183
277/399
(Continued)

FOREIGN PATENT DOCUMENTS

| EP | 3282153 A1 | 2/2018 |
| EP | 3382240 A1 | 10/2018 |
| EP | 3647634 A1 | 5/2020 |

OTHER PUBLICATIONS

Roymech Rotary Seals, Last Updated Aug. 10, 2010. Downloaded from https://web.archive.org/web/20120105204812/http://roymech.co.uk/Useful_Tables/Seals/Rotary_Seals.html, Downloaded Jan. 31, 2017.
(Continued)

*Primary Examiner* — Woody A Lee, Jr.
*Assistant Examiner* — Behnoush Haghighian
(74) *Attorney, Agent, or Firm* — Carlson, Gaskey & Olds, P.C.

(57) ABSTRACT

A gas turbine engine according to an exemplary aspect of the present disclosure includes, among other things, a compressor section, a combustor section, a turbine section, and at least one rotatable shaft. The engine further includes a seal assembly including a seal plate mounted for rotation with the rotatable shaft and a face seal in contact with the seal plate at a contact area. The seal plate includes a cooling passageway having a circumferentially-extending section radially aligned with the contact area.

16 Claims, 4 Drawing Sheets

(51) Int. Cl.
*F01D 25/16* (2006.01)
*F16C 33/72* (2006.01)
*F16C 37/00* (2006.01)
*F16J 15/34* (2006.01)
*F16C 33/66* (2006.01)

(52) U.S. Cl.
CPC .......... *F16C 37/00* (2013.01); *F16J 15/3404* (2013.01); *F01D 25/162* (2013.01); *F01D 25/18* (2013.01); *F05D 2240/55* (2013.01); *F16C 33/6659* (2013.01); *F16C 33/6677* (2013.01); *F16J 15/34* (2013.01); *F16J 15/342* (2013.01)

(56) References Cited

U.S. PATENT DOCUMENTS

| | | | | |
|---|---|---|---|---|
| 3,804,424 | A * | 4/1974 | Gardner | F16J 15/3412 277/360 |
| 3,915,521 | A | 10/1975 | Young | |
| 4,406,459 | A * | 9/1983 | Davis | F16J 15/3404 277/401 |
| 4,406,460 | A * | 9/1983 | Slayton | F16J 15/164 277/401 |
| 4,406,466 | A * | 9/1983 | Geary, Jr. | F16J 15/3412 277/347 |
| 4,928,978 | A * | 5/1990 | Shaffer | F01D 25/183 277/401 |
| 5,464,227 | A * | 11/1995 | Olson | F16J 15/3404 277/400 |
| 5,622,438 | A * | 4/1997 | Walsh | F01D 25/162 384/624 |
| 5,636,848 | A * | 6/1997 | Hager | F16J 15/164 277/420 |
| 5,639,096 | A * | 6/1997 | Ullah | F16J 15/3404 277/401 |
| 6,454,268 | B1 * | 9/2002 | Muraki | F16J 15/3412 277/361 |
| 6,719,296 | B2 * | 4/2004 | Brauer | F01D 11/003 277/409 |
| 7,946,590 | B2 | 5/2011 | Dobek et al. | |
| 8,845,282 | B2 * | 9/2014 | LaPierre | F01D 25/16 415/170.1 |
| 9,599,161 | B2 * | 3/2017 | Walker | F16C 33/60 |
| 9,631,508 | B2 | 4/2017 | Blais et al. | |
| 9,719,373 | B2 * | 8/2017 | Maret | F01D 25/186 |
| 9,909,438 | B2 * | 3/2018 | Duffy | F01D 11/003 |
| 9,951,872 | B2 | 4/2018 | Thorson et al. | |
| 10,174,635 | B2 * | 1/2019 | Walker | F01D 25/16 |
| 10,233,762 | B2 * | 3/2019 | Maret | F16J 15/3404 |
| 10,274,085 | B2 * | 4/2019 | Martin | F16J 15/162 |
| 10,352,456 | B2 * | 7/2019 | Amador | F16J 15/342 |
| 2009/0230628 | A1 * | 9/2009 | Dobek | F16J 15/3404 277/379 |
| 2011/0233871 | A1 | 9/2011 | Davis | |
| 2013/0078079 | A1 * | 3/2013 | LaPierre | F01D 25/16 415/110 |
| 2014/0119887 | A1 * | 5/2014 | Lyle | F01D 25/183 415/110 |
| 2014/0140824 | A1 * | 5/2014 | Sheridan | F01D 25/16 415/170.1 |
| 2014/0193243 | A1 | 7/2014 | Nallam et al. | |
| 2015/0152746 | A1 * | 6/2015 | Maret | F16J 15/324 415/1 |
| 2015/0275761 | A1 | 10/2015 | Duffy et al. | |
| 2016/0003100 | A1 * | 1/2016 | Walker | F01D 25/16 415/116 |
| 2016/0010477 | A1 * | 1/2016 | Maret | F01D 25/12 277/408 |
| 2016/0273657 | A1 * | 9/2016 | Amador | F16J 15/342 |
| 2017/0292394 | A1 * | 10/2017 | Duffy | F16J 15/406 |
| 2018/0045316 | A1 * | 2/2018 | Kovacik | F16J 15/324 |
| 2018/0283210 | A1 | 10/2018 | Cigal et al. | |
| 2019/0169988 | A1 * | 6/2019 | Tokunaga | F01C 19/025 |

OTHER PUBLICATIONS

European Search Report for European Application No. 20159549.3 completed on May 12, 2020.

* cited by examiner

GAS TURBINE ENGINE INCLUDING SEAL PLATE PROVIDING INCREASED COOLING ADJACENT CONTACT AREA

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seals near the rotating shafts contain oil within bearing compartments, which include bearings and seals. During operation of the engine, non-rotating seal faces contact rotating seal plates to maintain compartment pressures and keep lubricating oil inside the various compartments. Friction between the seals and seal plates generates heat and exposes the seals to relatively high temperatures. In the past, carbon materials have been used to increase seal wear life. In other assemblies, such as in U.S. Patent Application Publication No. 2013/0078079, a seal plate is cooled with a flow of cooling fluid, which increases heat transfer away from the seal and reduces seal operating temperature.

SUMMARY

A gas turbine engine according to an exemplary aspect of the present disclosure includes, among other things, a compressor section, a combustor section, a turbine section, and at least one rotatable shaft. The engine further includes a seal assembly including a seal plate mounted for rotation with the rotatable shaft and a face seal in contact with the seal plate at a contact area. The seal plate includes a cooling passageway having a circumferentially-extending section radially aligned with the contact area.

In a further non-limiting embodiment of the foregoing engine, the cooling passageway includes an inlet section between an inlet and the circumferentially-extending section, and the cooling passageway includes an outlet section between the circumferentially-extending section and an outlet.

In a further non-limiting embodiment of any of the foregoing engines, the inlet of the cooling passageway is circumferentially spaced-apart from the outlet of the cooling passageway.

In a further non-limiting embodiment of any of the foregoing engines, the engine includes a source of cooling fluid. Further, the seal plate is arranged such that the cooling fluid flows through the cooling passageway from the inlet to the outlet.

In a further non-limiting embodiment of any of the foregoing engines, the cooling passageway is arranged such that the cooling fluid turns substantially ninety degrees as the cooling fluid exits the inlet section and enters the circumferentially-extending section.

In a further non-limiting embodiment of any of the foregoing engines, the cooling passageway is arranged such that the cooling fluid exiting the inlet section impinges on a wall defining the circumferentially-extending section.

In a further non-limiting embodiment of any of the foregoing engines, the cooling passageway is arranged such that the cooling fluid turns substantially ninety degrees as the cooling fluid exits the circumferentially-extending section and enters the outlet section.

In a further non-limiting embodiment of any of the foregoing engines, a thickness of the seal plate between the circumferentially-extending section and the contact area is within a range of 0.02 inches and 0.08 inches.

In a further non-limiting embodiment of any of the foregoing engines, the thickness of the seal plate between the circumferentially-extending section and the contact area is about 0.03 inches.

In a further non-limiting embodiment of any of the foregoing engines, the engine includes a bearing assembly mounted relative to the rotatable shaft. The seal assembly is adjacent the bearing assembly.

In a further non-limiting embodiment of any of the foregoing engines, the face seal is made of a carbon material.

In a further non-limiting embodiment of any of the foregoing engines, the circumferentially-extending section radially overlaps the entire contact area.

In a further non-limiting embodiment of any of the foregoing engines, the cooling passageway is one of a plurality of substantially similar cooling passageways formed in the seal plate, and each of the plurality of cooling passageways is circumferentially spaced-apart from one another.

A bearing compartment for a gas turbine engine according to an exemplary aspect of the present disclosure includes, among other things, a bearing assembly and a seal assembly including a seal plate and a face seal in contact with the seal plate at a contact area. The seal plate includes a cooling passageway having a circumferentially-extending section radially aligned with the contact area.

In a further non-limiting embodiment of the foregoing bearing compartment, the cooling passageway includes an inlet section between an inlet and the circumferentially-extending section, and the cooling passageway includes an outlet section between the circumferentially-extending section and an outlet.

In a further non-limiting embodiment of any of the foregoing bearing compartments, the inlet of the cooling passageway is circumferentially spaced-apart from the outlet of the cooling passageway.

In a further non-limiting embodiment of any of the foregoing bearing compartments, the bearing compartment includes a source of cooling fluid. The seal plate is arranged such that the cooling fluid flows through the cooling passageway from the inlet to the outlet.

In a further non-limiting embodiment of any of the foregoing bearing compartments, the cooling passageway is arranged such that the cooling fluid turns substantially ninety degrees as the cooling fluid exits the inlet section and enters the circumferentially-extending section.

In a further non-limiting embodiment of any of the foregoing bearing compartments, the cooling passageway is arranged such that the cooling fluid exiting the inlet section impinges on a wall defining the circumferentially-extending section.

In a further non-limiting embodiment of any of the foregoing bearing compartments, the cooling passageway is arranged such that the cooling fluid turns substantially ninety degrees as the cooling fluid exits the circumferentially-extending section and enters the outlet section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

In FIG. 6, the cooling passageways are configured differently than in FIG. 5.

DETAILED DESCRIPTION

Figure 1:
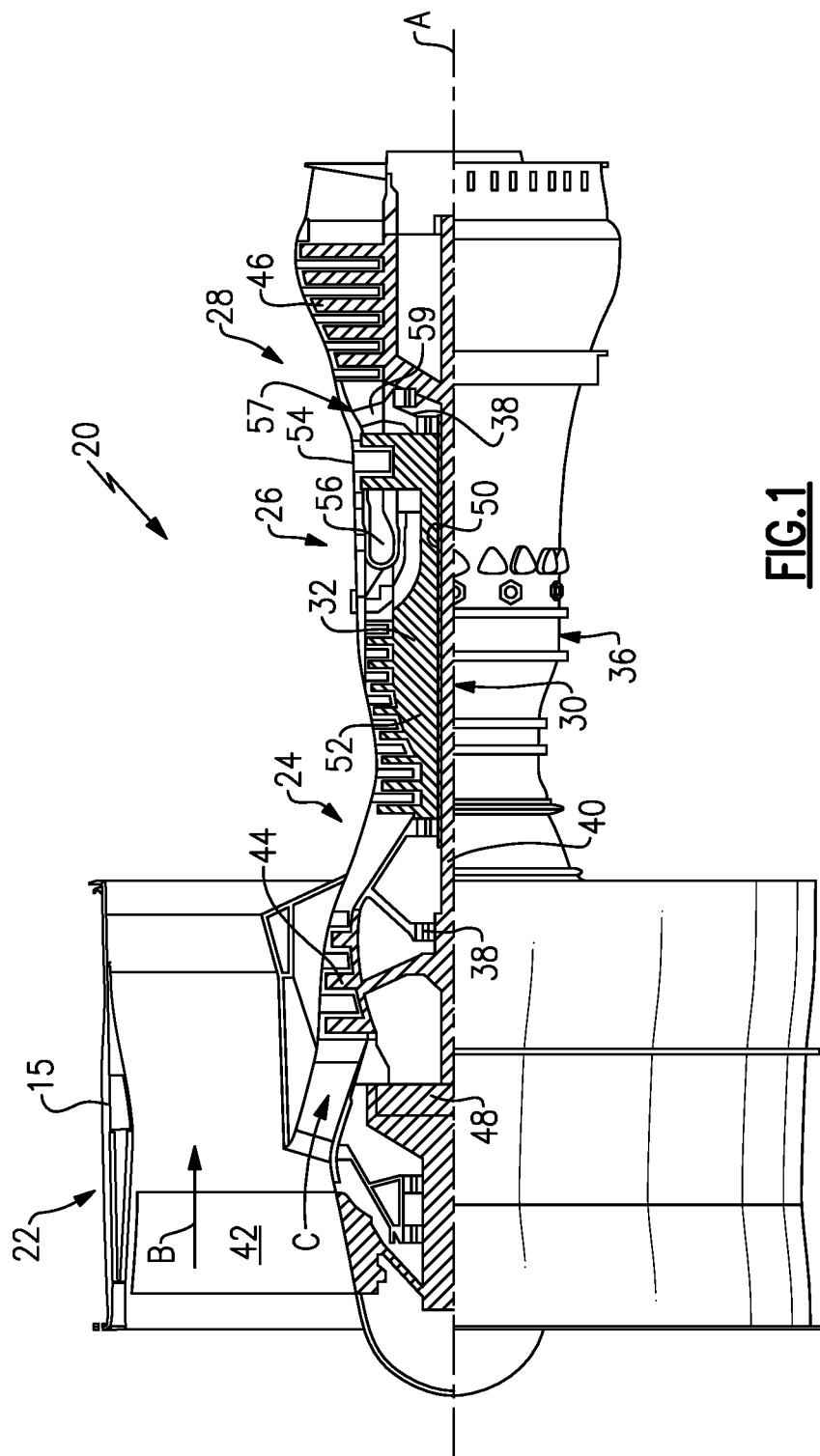
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
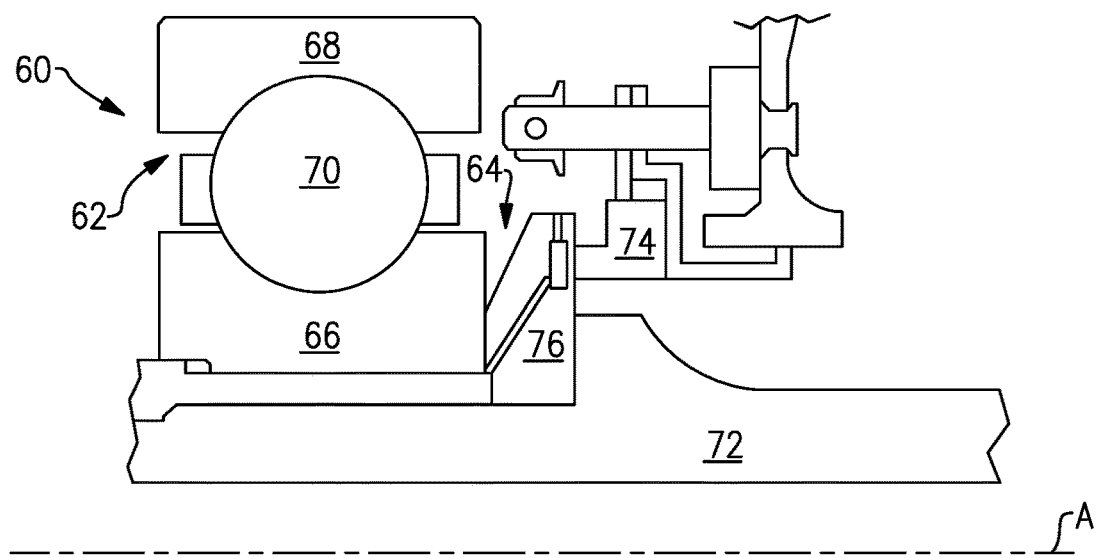
FIG. 2 illustrates a portion of the engine, and in particular illustrates a bearing compartment including a bearing assembly and a seal assembly.

FIG. 2 is a partial cross-sectional view of a bearing compartment 60 of the engine 20. The bearing compartment 60 includes a bearing assembly 62 and a seal assembly 64 adjacent the bearing assembly 62. As is known in the art, the bearing assembly 62 includes an inner race 66, an outer race 68, and rolling elements, such as balls, 70 configured to roll therebetween. The bearing assembly 62 is mounted relative to a shaft 72 of the engine 20. The shaft 72 serves as a radially inner boundary for the bearing compartment 60.

The bearing compartment 60 is representative of any bearing compartment within the engine 20. Further, the shaft 72 represents either the inner shaft 40 or the outer shaft 50. This disclosure is not limited to bearing compartments at any particular engine location. Further, this disclosure applies outside the context of bearing compartments.

The seal assembly 64 includes a face seal 74 a seal plate 76. In this example, the face seal 74 is mounted to a static structure, and therefore does not rotate during operation of the engine 20. The face seal 74 may be made of a carbon (C) material, however other materials come within the scope of this disclosure.

The face seal 74 is biased against and in direct contact with the seal plate 76. The seal plate 76 is configured to rotate about the engine central longitudinal axis A with the shaft 72. The contact area between the face seal 74 and the seal plate 76 generates significant heat during operation of the gas turbine engine 20. An example cooling scheme for the face seal 74 will now be described in detail.

Figure 3:
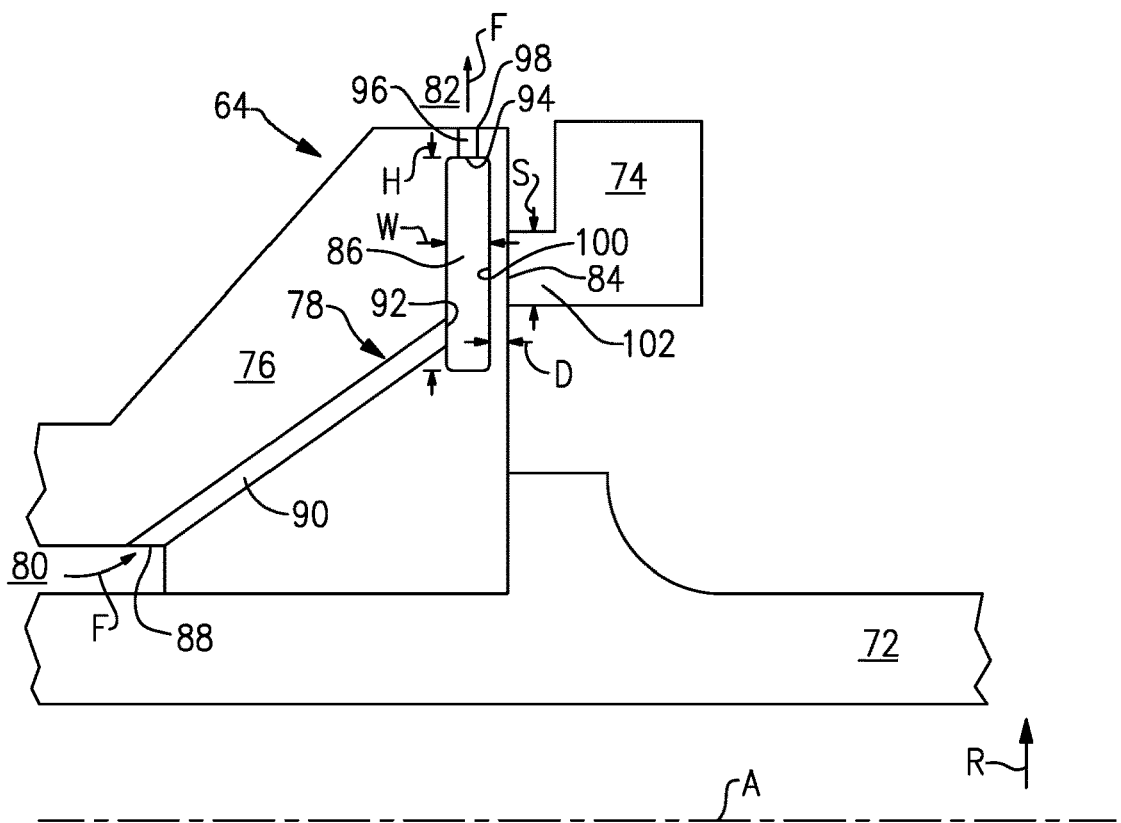
FIG. 3 is a close-up view of the portion of the engine of FIG. 2, and illustrates additional detail of the seal assembly.

FIG. 3 is a close-up view of a portion of the bearing compartment 60, and illustrates additional detail of the seal assembly 64. As shown in FIG. 3, the seal plate 76 includes a cooling passageway 78 configured to direct a flow of cooling fluid F from a radially inner location 80 to a radially outer location 82. The term "radially" refers to the radial direction R, which is normal to the engine central longitudinal axis A. In one example, the radially inner location 80 is a location radially between the seal plate 76 and the shaft 72, and the radially outer location 82 is radially outside the seal plate 76. The fluid F may be an air-oil mixture, such as oil mist. The face seal 74 is biased against the seal plate 76 to keep the fluid F within the bearing compartment 60 and to prevent ingress of other potential contaminants.

The fluid F serves to cool the seal plate 76, which may generate significant heat during operation by virtue of its contact with the face seal 74. In particular, in FIG. 3, the seal plate 76 and the face seal 74 contact at a contact area 84. The contact area 84 is an area where the fore face seal 74 directly contacts the aft face of the seal plate 76. The term "contact area" in this disclosure is not limited to the actual contact area where, at a molecular level, the face seal 74 and the seal plate 76 truly do contact, but instead refers to the apparent contact area.

As will be explained in more detail below, the cooling passageway 78 includes a circumferentially-extending section 86 adjacent the contact area 84. The circumferentially-extending section 86 is arranged such that fluid F within the cooling passageway 78 absorbs a relatively large amount of heat from the contact area 84.

Figure 4:
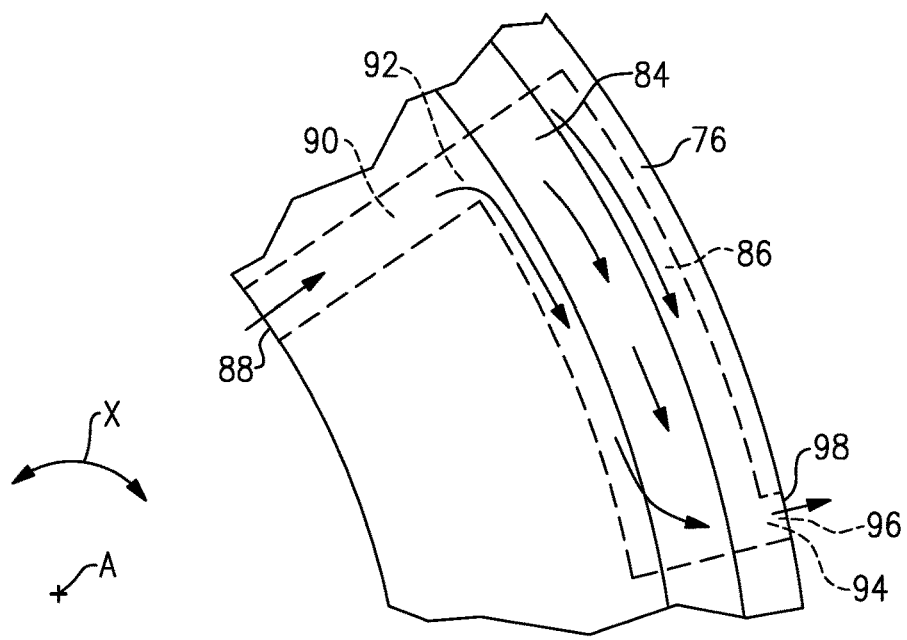
FIG. 4 is a close-up view of a portion of a seal plate from an exterior perspective.

With joint reference to FIGS. 3 and 4, the cooling passageway 78 includes an inlet 88 adjacent the radially inner location 80, which leads to an inlet section 90 of the cooling passageway 78. The inlet section 90 is inclined relative to the engine central longitudinal axis A and fluidly couples the inlet 88 to circumferentially-extending section 86. In particular, in this example, the inlet section 90 has both a radial and an axial component. The inlet section 90 may be provided by a cylindrical bore, in some examples. The inlet section 90, in this example, does not direct fluid in a circumferential direction within the seal plate 76.

The circumferentially-extending section 86 extends circumferentially, in the circumferential direction X, about the engine central longitudinal axis A, from a first circumferential location 92 where the inlet section 90 fluidly couples to the circumferentially-extending section 86 to a second circumferential location 94. At the second circumferential location 94, the circumferentially-extending section 86 is fluidly coupled to an outlet section 96 of the cooling passageway 78.

The outlet section 96 extends in the radial direction R from the circumferentially-extending section 86 to an outlet 98 of the cooling passageway 78. The outlet 98 is provided by a cylindrical bore, in one example, which extends in a direction parallel to the radial direction, and does not have an axial or circumferential component.

As is perhaps best seen in FIG. 4, the inlet 88 of the cooling passageway 78 is circumferentially spaced-apart, the circumferential direction X, from the outlet 98. More particularly, the inlet section 90 and the outlet section 96 are fluidly coupled to opposite circumferential sides of the circumferentially-extending section 86, and thus the inlet and outlet sections 90, 96 are circumferentially spaced-apart from one another.

During operation of the gas turbine engine 20, fluid F enters the inlet 88 and flows through the inlet section 90 toward the circumferentially-extending section 86. As the fluid F exits the inlet section 90 and enters the circumferentially-extending section 86, the fluid F impinges upon an aft surface 100 defining an aft-most boundary of the circumferentially extending section 86. The fluid F also turns substantially ninety degrees toward the circumferential direction X, and continues downstream, flowing circumferentially through the circumferentially-extending section 86, absorbing heat from the contact area 84. Adjacent the outlet section 98, the fluid F again turns substantially ninety degrees toward the radial direction R as it exits the circumferentially-extending section 86 and enters the outlet section 96.

The circumferentially-extending passageway 86 is arranged so that fluid flowing therein absorbs a substantial amount of heat from the contact area 84. In particular, the circumferentially-extending passageway 86 is substantially rectangular in cross-section, having a height H in the radial direction R which is greater than a width W in the axial direction A. Further, the aft surface 100 is relatively close to the contact area 84. In one example, the aft surface 100 is spaced-apart from the contact area 84 by a distance D in the axial direction A, which in one example is within a range of 0.02 inches (about 0.05 cm) and 0.08 inches (0.2 cm). In a particular example, the distance D is 0.03 inches (about 0.08 cm).

Further, the circumferentially-extending section 86 is radially aligned with the contact area 84, meaning they are present at the same radial distance from the engine central longitudinal axis A. In fact, in this example, the circumferentially-extending section 86 is arranged such that its height H extends radially inward and outward of the contact area 84. More particularly, the height H extends radially inward and outward of a portion 102 of the face seal 74 that contacts the seal plate 76. In particular, in this example, the portion 102 has a height S, which is less than the height H. To this end, the contact area 84 also exhibits the height S. While the circumferentially-extending section 86 radially overlaps the entire contact area 84 in FIG. 3, this disclosure extends to arrangements where at least a portion of the circumferentially-extending section 86 is radially aligned with the contact area 84.

By allowing fluid F to flow circumferentially through the seal plate 76 and in close proximity to the contact area 84, while also including the added benefits of impinging the fluid F against the aft surface 100, the cooling passageway 78 absorbs a relatively large amount of heat from the contact area 84, which has a number of benefits. Namely, since the fluid F absorbs more heat, the face seal 74 and seal plate 76 may be smaller than prior designs. This reduces material, leading to cost savings and weight reduction. This disclosure also prolongs the effectiveness and the operating life of the seal assembly 64.

Figure 5:
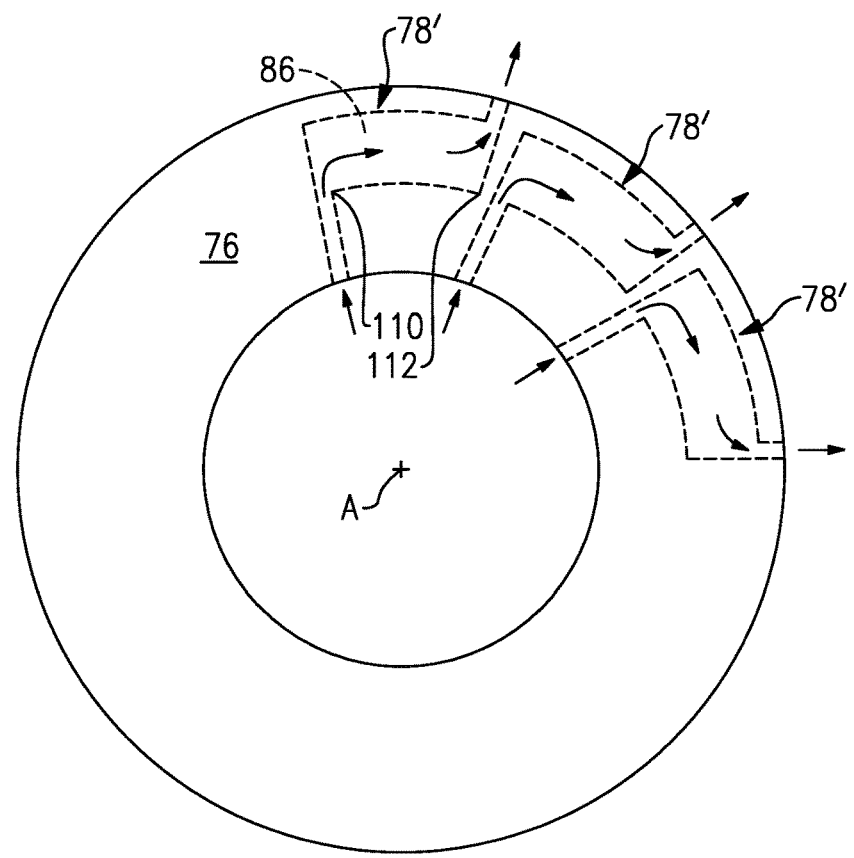
FIG. 5 is a view of the seal plate from an exterior perspective.

In some circumstances, cooling passageways such as those described above cause the fluid F to absorb too much heat from the contact area 84. In such circumstances, the fluid F could change phase. In order to avoid this, in one aspect of this disclosure, the seal plate 76 includes a plurality of cooling passageways 78' arranged in substantially the same way as the cooling passageway 78 discussed above. Each of the individual cooling passageways 78' is circumferentially spaced-apart from one another, as shown in FIG. 5. With additional cooling passageways 78', the fluid in each of the individual cooling passageways absorbs only a fraction of the heat generated between the face seal 74 and seal plate 76. In one embodiment, the seal plate 76 includes between four and twelve cooling passageways 78'. That said, this disclosure extends to seal plates 76 having one or more cooling passageways 78'.

In one aspect of this disclosure, the cooling passageway 78 may include flow augmentation features, such as trip strips, bumps, dimples, pedestals, etc. Such features may be formed in the inlet section 90, the outlet section 96, and/or the circumferentially-extending section 86.

Figure 6:
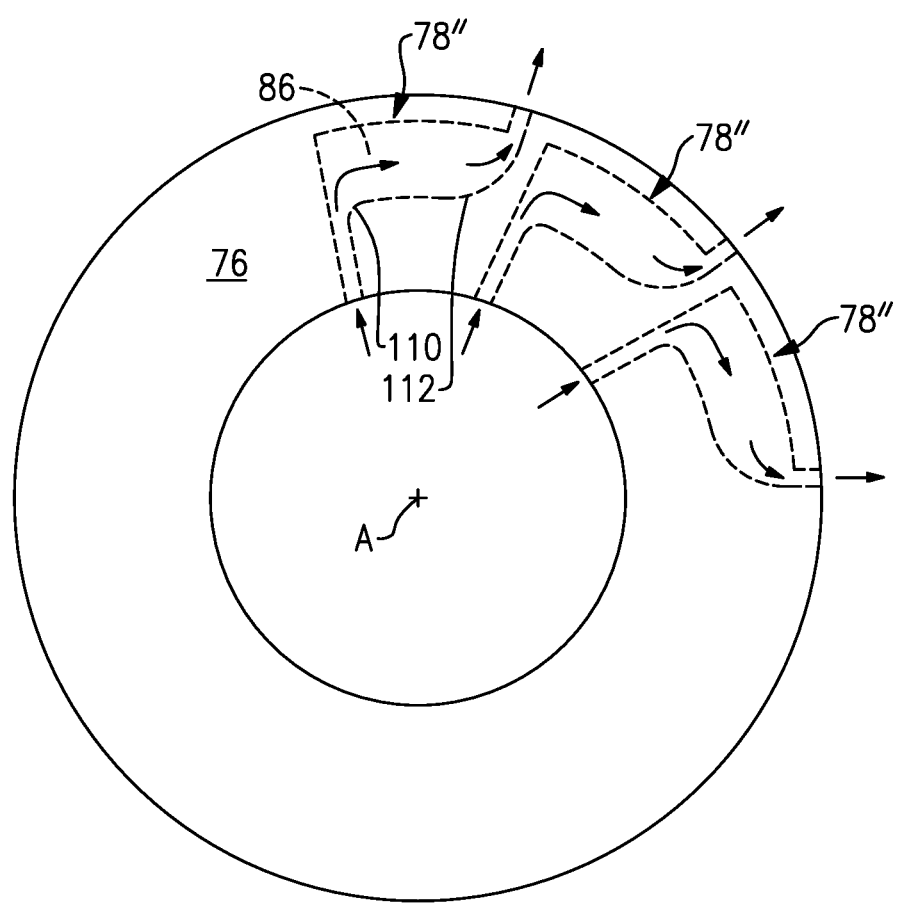
FIG. 6 is a view of the seal plate from an exterior perspective.

FIG. 6 illustrates another aspect of this disclosure. Specifically, FIG. 6 is similar to FIG. 5, but illustrates a seal plate 76 having different cooling passageways 78". The cooling passageways 78" substantially correspond to the cooling passageways 78, 78', however the cooling passageways 78" are curved and have rounded corners to reduce pressure losses, enhance heat transfer, and distribute heat transfer evenly as the fluid mixture increases in temperature. For instance, in FIG. 6, a lower (i.e., radially inner) boundary of the circumferentially-extending section 86 includes a first transition 110 adjacent the first circumferential location 92, and a second transition 112 adjacent the second circumferential location 94. In FIG. 6, the transitions 110, 112 are rounded and smooth. In FIG. 5, on the other hand, the first and second transitions 110, 112 are arranged as 90°±15° angles.

The seal plate 76 can be formed using one of a number of known manufacturing techniques, including lost wax casting or additive manufacturing. Alternatively, the cooling passageway 78 could be formed in the seal plate 76 using more traditional manufacturing techniques such as milling and drilling. In that example, the seal plate 76 could be a multi-piece part. The circumferentially extending section 86 could be milled, and the inlet and outlet sections 90, 96 could be drilled, as examples, into a first piece. Then, a second piece could be attached to the first piece, such as by welding or brazing, to enclose the circumferentially-extending section 86. While some example manufacturing techniques have been mentioned herein, this disclosure extends to other manufacturing techniques.

It should be understood that terms such as "axial" and "radial" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms. Additionally, while many components of the engine 20 are shown in cross-section in the figures, it should be understood that certain of these components extend circumferentially around the engine central longitudinal axis A.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a compressor section, a combustor section, a turbine section, and at least one rotatable shaft; and
   a seal assembly including a seal plate mounted for rotation with the rotatable shaft and a face seal in contact with the seal plate at a contact area, the seal plate including a cooling passageway having a circumferentially-extending section radially aligned with the contact area, wherein the cooling passageway includes an inlet section between an inlet and the circumferentially-extending section, wherein the cooling passageway includes an outlet section between the circumferentially-extending section and an outlet; and
   a source of cooling fluid, wherein the seal plate is arranged such that the cooling fluid flows through the cooling passageway from the inlet to the outlet, wherein the cooling passageway is arranged such that the cooling fluid turns substantially ninety degrees as the cooling fluid exits the inlet section and enters the circumferentially-extending section, wherein the cooling passageway is arranged such that the cooling fluid turns substantially ninety degrees as the cooling fluid exits the circumferentially-extending section and enters the outlet section, and wherein the circumferentially-extending section is substantially rectangular in cross-section including a width in an axial direction and a height in a radial direction greater than the width.

2. The gas turbine engine as recited in claim 1, wherein: the inlet of the cooling passageway is circumferentially spaced-apart from the outlet of the cooling passageway.

3. The gas turbine engine as recited in claim 1, wherein the cooling passageway is arranged such that the cooling fluid exiting the inlet section impinges on a wall defining the circumferentially-extending section.

4. The gas turbine engine as recited in claim 3, wherein the wall extends between the circumferentially-extending section and the contact area and exhibits a thickness in the radial direction within a range of 0.02 inches and 0.08 inches.

5. The gas turbine engine as recited in claim 4, wherein the thickness is about 0.03 inches.

6. The gas turbine engine as recited in claim 1, further comprising:
   a bearing assembly mounted relative to the rotatable shaft, wherein the seal assembly is adjacent the bearing assembly.

7. The gas turbine engine as recited in claim 1, wherein the face seal is made of a carbon material.

8. The gas turbine engine as recited in claim 1, wherein the circumferentially-extending section radially overlaps the entire contact area.

9. The gas turbine engine as recited in claim 1, wherein:
the cooling passageway is one of a plurality of substantially similar cooling passageways formed in the seal plate, and
each of the plurality of cooling passageways is circumferentially spaced-apart from one another.

10. A bearing compartment for a gas turbine engine, comprising:
a bearing assembly; and
a seal assembly including a seal plate and a face seal in contact with the seal plate at a contact area, the seal plate including a cooling passageway having a circumferentially-extending section radially aligned with the contact area, wherein the cooling passageway includes an inlet section between an inlet and the circumferentially-extending section, wherein the cooling passageway includes an outlet section between the circumferentially-extending section and an outlet; and
a source of cooling fluid wherein the seal plate is arranged such that the cooling fluid flows through the cooling passageway from the inlet to the outlet, wherein the cooling passageway is arranged such that the cooling fluid turns substantially ninety degrees as the cooling fluid exits the inlet section and enters the circumferentially-extending section, wherein the cooling passageway is arranged such that the cooling fluid turns substantially ninety degrees as the cooling fluid exits the circumferentially-extending section and enters the outlet section and wherein the circumferentially-extending section is substantially rectangular in cross-section, including a width in an axial direction and a height in a radial direction greater than the width.

11. The bearing compartment as recited in claim 10, wherein:
the inlet of the cooling passageway is circumferentially spaced-apart from the outlet of the cooling passageway.

12. The bearing compartment as recited in claim 10, wherein the cooling passageway is arranged such that the cooling fluid exiting the inlet section impinges on a wall defining the circumferentially-extending section.

13. The gas turbine engine as recited in claim 1, wherein the height of the circumferentially-extending section extends radially inward and radially outward of the contact area.

14. The gas turbine engine as recited in claim 13, wherein a height of a portion of the face seal in contact with the seal plate is less than the height of the circumferentially-extending section.

15. The gas turbine engine as recited in claim 1, wherein the circumferentially-extending section includes a first rounded corner adjacent the inlet section configured to turn the cooling fluid exiting the inlet section, and further includes a second rounded corner adjacent the outlet section configured to turn the cooling fluid exiting the circumferentially-extending section.

16. The gas turbine engine as recited in claim 1, wherein the axial direction is parallel to an engine central longitudinal axis and the radial direction is normal to the engine central longitudinal axis.

* * * * *